United States Patent
Wang

(10) Patent No.: US 11,140,162 B2
(45) Date of Patent: Oct. 5, 2021

(54) RESPONSE METHOD AND SYSTEM IN VIRTUAL NETWORK COMPUTING AUTHENTICATION, AND PROXY SERVER

(71) Applicant: Huawei Technologies Co., Ltd., Shenzhen (CN)

(72) Inventor: Xianlei Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 270 days.

(21) Appl. No.: 15/845,631

(22) Filed: Dec. 18, 2017

(65) Prior Publication Data

US 2018/0124051 A1 May 3, 2018

Related U.S. Application Data

(63) Continuation of application No. PCT/CN2016/090058, filed on Jul. 14, 2016.

(51) Int. Cl.
*H04L 29/06* (2006.01)
*H04L 29/08* (2006.01)
(Continued)

(52) U.S. Cl.
CPC ...... *H04L 63/0884* (2013.01); *H04L 63/0281* (2013.01); *H04L 63/083* (2013.01);
(Continued)

(58) Field of Classification Search
CPC ............. H04L 63/0884; H04L 63/0281; H04L 63/083; H04L 63/105; H04L 67/08
(Continued)

(56) References Cited

U.S. PATENT DOCUMENTS 6,606,663 B1 * 8/2003 Liao ................. G06Q 20/20
705/25
8,074,259 B1 * 12/2011 Levy ................. H04L 63/08
726/2

(Continued)

FOREIGN PATENT DOCUMENTS

CA 2444066 A1 10/2002
CN 1520550 A 8/2004
(Continued)

OTHER PUBLICATIONS

Vasic, "Deja Vu: Accelerating Resource Allocation in Virtualized Environments", Mar. 2012, ACM, pp. 1-13 (Year: 2012).*

(Continued)

*Primary Examiner* — David J Pearson
*Assistant Examiner* — Gregory A Lane
(74) *Attorney, Agent, or Firm* — Conley Rose, P.C.

(57) ABSTRACT

A response method and system in virtual network computing authentication, and a proxy server, where the method includes receiving, by a proxy server, a password from a controller, receiving challenge information from a serving end, where the challenge information is generated by the serving end based on the virtual network computing authentication, determining a first response value according to the password and the challenge information, and sending the first response value to the serving end in order to resolve a problem that sensitive data of a user is leaked or decrypted by brute force because a response process in the virtual network computing authentication is completed by a client, thereby improving security in the virtual network computing authentication process.

20 Claims, 7 Drawing Sheets

(51) Int. Cl.
 *G06F 3/14* (2006.01)
 *H04L 12/46* (2006.01)
(52) U.S. Cl.
 CPC ............ *H04L 63/105* (2013.01); *H04L 67/08* (2013.01); *G06F 3/1454* (2013.01); *H04L 12/4641* (2013.01); *H04L 67/02* (2013.01); *H04L 67/42* (2013.01)
(58) Field of Classification Search
 USPC .......................................................... 726/7
 See application file for complete search history.

(56) References Cited

U.S. PATENT DOCUMENTS

| | | | | |
|---|---|---|---|---|
| 9,154,479 | B1* | 10/2015 | Sethi | H04L 63/0227 |
| 10,404,663 | B1* | 9/2019 | Petrukhin | G06F 11/1402 |
| 2002/0071427 | A1* | 6/2002 | Schneider | H04L 12/5601 |
| | | | | 370/352 |
| 2004/0123144 | A1* | 6/2004 | Chan | H04L 63/0281 |
| | | | | 726/8 |
| 2005/0198380 | A1 | 9/2005 | Panasyuk et al. | |
| 2006/0269066 | A1* | 11/2006 | Whitehead | H04L 9/0662 |
| | | | | 380/270 |
| 2010/0306547 | A1 | 12/2010 | Fallows et al. | |
| 2013/0046976 | A1* | 2/2013 | Rosati | H04L 63/0853 |
| | | | | 713/168 |
| 2014/0310787 | A1 | 10/2014 | Morley et al. | |
| 2015/0121496 | A1* | 4/2015 | Caldeira de Andrada | |
| | | | | H04L 63/08 |
| | | | | 726/7 |
| 2015/0163245 | A1 | 6/2015 | Kondamuru et al. | |
| 2015/0365412 | A1 | 12/2015 | Innes et al. | |
| 2016/0197909 | A1* | 7/2016 | Innes | H04L 63/0807 |
| | | | | 726/6 |
| 2016/0219054 | A1* | 7/2016 | Nagata | G06F 3/14 |
| 2016/0315923 | A1* | 10/2016 | Riscombe-Burton | |
| | | | | H04L 63/10 |
| 2017/0257359 | A1* | 9/2017 | Ogawa | H04L 63/0853 |

FOREIGN PATENT DOCUMENTS

| | | |
|---|---|---|
| CN | 101645775 A | 2/2010 |
| CN | 102523207 A | 6/2012 |
| CN | 103314566 A | 9/2013 |
| CN | 104639562 A | 5/2015 |
| CN | 105071941 A | 11/2015 |
| CN | 105359486 A | 2/2016 |

OTHER PUBLICATIONS

Foreign Communication From A Counterpart Application, European Application No. 16890125.4, Extended European Search Report dated Apr. 17, 2018, 11 pages.
Machine Translation and Abstract of Chinese Publication No. CN105071941, 105071941, Nov. 18, 2015, 45 pages.
Foreign Communication From A Counterpart Application, Chinese Application No. 201680004718.5, Chinese Office Action dated Apr. 28, 2019, 9 pages.
Machine Translation and Abstract of Chinese Publication No. CN101645775, Feb. 10, 2010, 14 pages.
Machine Translation and Abstract of Chinese Publication No. CN102523207, Jun. 27, 2012, 23 pages.
Richardson, T., et al., "The Remote Framebufter Protocol," RFC 6143, Mar. 2011, 39 pages.
Fette, I., et al., "The WebSocket Protocol," RFC 6455, Dec. 2011, 71 pages.
Foreign Communication From A Counterpart Application, PCT Application No. PCT/CN2016/090058, International Search Report dated Apr. 5, 2017, 4 pages.
Machine Translation and Abstract of Chinese Publication No. CN104639562, May 20, 2015, 28 pages.
Foreign Communication From A Counterpart Application, Chinese Application No. 201680004718.5, Chinese Office dated Nov. 4, 2019, 12 pages.

* cited by examiner

RESPONSE METHOD AND SYSTEM IN VIRTUAL NETWORK COMPUTING AUTHENTICATION, AND PROXY SERVER

CROSS-REFERENCE TO RELATED APPLICATION

This application is a continuation of International Patent Application No. PCT/CN2016/090058 filed on Jul. 14, 2016, which is hereby incorporated by reference in its entirety.

TECHNICAL FIELD

The present disclosure relates to the field of computer technologies, and in particular, to a response method and system in virtual network computing (VNC) authentication, and a proxy server.

BACKGROUND

VNC is a graphical desktop sharing system that remotely controls another computer based on the Remote Frame Buffer (RFB) protocol and provides a user with a channel for remotely managing a virtual machine or a server.

In other approaches, the VNC includes a client, a proxy server, and a serving end. The client is generally a browser or a VNC connection tool. The serving end is a destination end of a VNC connection request. The proxy server implements central management and control of a VNC service. All data packets between the client and the serving end are transmitted by the proxy server. In each VNC connection request, the client and the serving end need to determine, by means of negotiation, an RFB protocol version and a security authentication type that are used for this VNC connection request. The security authentication type includes invalid, none, and VNC authentication. In a VNC authentication process, the client needs to perform, according to a password of a user, encryption on challenge information generated by the serving end based on the VNC authentication to determine a response value. The response value is sent to the serving end by the proxy server, and the serving end determines another response value according to the password of the user and the challenge information using an encryption algorithm that is the same as that of the client. The VNC authentication succeeds if the response value determined by the serving end is the same as the response value sent by the client. However, as the VNC is applied to increasing scenarios, a user can access a serving end using any client, and a device on which the client is located is usually in a network environment of an untrusted domain. In this case, when the client completes a response process of challenge information sent by the serving end, sensitive data of a user, such as a password, needs to be transmitted from a network environment of a trusted domain to the network environment of the untrusted domain, and stored in the client of the untrusted domain. Consequently, a problem that sensitive data is leaked or decrypted by brute force may occur, and security in a VNC authentication process is affected.

SUMMARY

The present disclosure provides a response method and system in VNC authentication, and a proxy server. The proxy server replaces a client to complete a response process in the VNC authentication such that a problem that sensitive data of a user is leaked or decrypted by brute force because the VNC authentication is completed by the client is resolved, and security in a VNC authentication process is improved.

According to a first aspect, a response method in VNC authentication is provided, and the method includes receiving, by a proxy server, a password sent by a controller, receiving, by the proxy server, challenge information sent by a serving end, where the challenge information is generated by the serving end based on the VNC authentication, determining, by the proxy server, a first response value according to the password and the challenge information, and sending, by the proxy server, the first response value to the serving end.

Further, the challenge information is a 16-byte random number, the proxy server determines a response value according to the password and the challenge information using a predefined data encryption algorithm, and sends the response value to the serving end in order to complete a response process in the VNC authentication.

According to a description of the foregoing content, in a response process in VNC authentication, after receiving challenge information sent by a serving end, a proxy server may determine a first response value according to a password and the challenge information, and send the first response value to the serving end in order to complete the response process in the VNC authentication. Compared with the other approaches, the proxy server replaces a client to complete the response process in the VNC authentication such that a problem that sensitive data of a user is leaked or decrypted by brute force because the sensitive data is transmitted to a network environment of an untrusted domain is avoided, and security in a VNC authentication process is improved.

With reference to the first aspect, in a first possible implementation of the first aspect, before sending, by the proxy server, the first response value to the serving end, the method further includes sending, by the proxy server, the challenge information to a client, receiving, by the proxy server, a response message sent by the client, where the response message includes a second response value, and the second response value is the challenge information, and replacing, by the proxy server, the second response value in the response message with the first response value, and sending, by the proxy server, the first response value to the serving end includes sending, by the proxy server, the response message to the serving end.

Further, the second response value is the challenge information. Further, the client does not process the challenge information, but directly sends the challenge information in a form of the response message to the proxy server as the response value.

According to a description of the foregoing content, when receiving challenge information, a proxy server may send the challenge information to a client. However, the client does not process the challenge information, but directly sends the challenge information in a form of a response message to the proxy server as a response value. The proxy server replaces the response value in the response message and sends the response message to the serving end in order to complete a response process in VNC authentication. Compared with the other approaches, sensitive data of a user, such as a password, does not need to be transmitted to an untrusted domain, and the response process in the VNC authentication can be completed in a network environment of a trusted domain such that a problem in the other approaches that the sensitive data is leaked or decrypted by brute force because the password is transmitted to the untrusted domain is avoided. Therefore, security in a VNC authentication process is improved. In addition, according to a processing process of the RFB protocol, in a process in which the client still receives the challenge information and returns the response value, impact on the processing process of the RFB protocol in the other approaches is reduced, and information security in the VNC authentication process is improved.

With reference to any one of the first aspect or the first possible implementation of the first aspect, in a second possible implementation of the first aspect, the method further includes receiving, by the serving end, the password sent by the controller, and determining, by the serving end, a third response value according to the password and the challenge information, where the VNC authentication succeeds if the serving end determines that the first response value is the same as the third response value.

Further, the serving end determines the third response value according to the password and the challenge information using a predefined data encryption algorithm that is the same as that of the proxy server, and compares the first response value with the third response value when the first response value is received. The VNC authentication succeeds if the first response value and the third response value are the same.

It should be noted that, the controller generates one password for each serving end in an initial phase as a VNC login password, and sends the password to the serving end to determine whether authentication of the response value sent by the proxy server succeeds.

With reference to a possible implementation of the first aspect, in a third possible implementation of the first aspect, before receiving, by a proxy server, a password sent by a controller, the method further includes receiving, by the proxy server, a connection request from a client, obtaining, by the proxy server, a token in the connection request of the client, and sending, by the proxy server, the token to the controller such that the controller performs authentication according to the token, and receiving, by a proxy server, a password sent by a controller includes receiving, by the proxy server, an authentication success message from the controller, where the authentication success message carries an Internet Protocol (IP) address, a port number, and the password of the serving end.

With reference to the third possible implementation of the first aspect, in a fourth possible implementation of the first aspect, after receiving, by a proxy server, a password sent by a controller, the method further includes establishing, by the proxy server, a connection to the serving end according to the IP address and the port number of the serving end, receiving, by the proxy server, first protocol version information sent by the serving end, where the first protocol version information indicates a highest protocol version supported by the serving end, sending, by the proxy server, the first protocol version information to the client, receiving, by the proxy server, second protocol version information sent by the client, where the second protocol version information indicates a highest protocol version that is not higher than the first protocol version information and that is supported by the client, and sending, by the proxy server, the second protocol version information to the serving end such that the serving end determines, according to the second protocol version information, a protocol version that is used for communication with the client and the serving end.

With reference to the fourth possible implementation of the first aspect, in a fifth possible implementation of the first aspect, the method further includes receiving, by the proxy server, a first security authentication type sent by the serving end, where the first security authentication type includes all security authentication types supported by the serving end, sending, by the proxy server, the first security authentication type to the client, receiving, by the proxy server, a second security authentication type sent by the client, where the second security authentication type is a highest-level security authentication type supported by the client in the first security authentication type, and sending, by the proxy server, the second security authentication type to the serving end such that the serving end determines, according to the second security authentication type, a security authentication type to be used between the client and the serving end.

It should be noted that, the first security authentication type is used only for identifying a security authentication type that is sent by the serving end to the proxy server, and does not indicate a quantity.

Further, if the security authentication type determined by the serving end is VNC authentication, the client and the serving end complete security authentication according to the VNC authentication type. If the security authentication type that is determined, by means of negotiation, by the serving end is none, no authentication needs to be performed between the client and the serving end, or if the security authentication type that is determined, by means of negotiation, by the serving end is invalid, a VNC session between the client and the serving end is terminated.

Optionally, during specific implementation, to ensure system security, a security authentication type is usually specified by the serving end. That is, the first security authentication type sent by the serving end is the specified security authentication type. If the second security authentication type returned by the client is different from the first security authentication type, a process for negotiating the security authentication type fails, and this VNC connection request is terminated.

According to a description of the foregoing content, a serving end and a client determine, by means of negotiation, a protocol version and a security authentication type for this VNC connection request. When challenge information that is generated by the serving end according to VNC authentication is received, a response process in the VNC authentication is completed using the challenge information and a password. Compared with the other approaches, a proxy server may replace the client to complete the response process in the VNC authentication between the client and the serving end such that a problem that information is leaked or decrypted by brute force because sensitive data of a user is transmitted to an untrusted domain is avoided, and security in a VNC authentication process is improved.

In conclusion, according to a description of the foregoing content, a proxy server replaces a client to complete a response process in VNC authentication. Compared with the other approaches, sensitive data of a user, such as a password, does not need to be transmitted to a network environment of an untrusted domain, and the response process in the VNC authentication can be completed in a network environment of a trusted domain such that a problem that the sensitive data is leaked or decrypted by brute force because the sensitive data is stored in the network environment of the untrusted domain is avoided. Therefore, security in a VNC authentication process is improved. In addition, according to a processing process of the RFB protocol, in a process in which the client still receives challenge information and returns a response value, impact on the processing process of the RFB protocol in the other approaches is reduced, and information security in the VNC authentication process is improved.

According to a second aspect, a response system in VNC authentication is provided, where the system includes a controller, a client, a proxy server, and a serving end. The client is configured to send a connection request to the proxy server. The proxy server is configured to obtain a token in the connection request, and send the token to the controller for performing authentication. The controller is configured to perform authentication on the client according to the token, and send an authentication success message to the proxy server if the authentication succeeds, where the authentication success message carries an IP address, a port number, and a password of the serving end. The proxy server is further configured to receive the authentication success message sent by the controller, and establish a connection to the serving end according to the IP address and the port number. The serving end is configured to generate challenge information based on the VNC authentication, and send the challenge information to the proxy server, and the proxy server is further configured to receive the challenge information, determine a first response value according to the password and the challenge information, and send the first response value to the serving end.

According to a description of the foregoing content, in a response process in VNC authentication, after receiving challenge information sent by the serving end, the proxy server may determine a first response value according to a password and the challenge information, and send the first response value to the serving end in order to complete the response process in the VNC authentication. Compared with the other approaches, the proxy server replaces the client to complete the response process in the VNC authentication such that a problem that sensitive data of a user is leaked or decrypted by brute force because the sensitive data is transmitted to a network environment of an untrusted domain is avoided, and security in a VNC authentication process is improved.

With reference to a possible implementation of the second aspect, in a first possible implementation of the second aspect, the proxy server is further configured to send the challenge information to the client before sending the first response value to the serving end, receive a response message sent by the client, where the response message includes a second response value, and the second response value is the challenge information, and replace the second response value in the response message with the first response value, and that the proxy server sends the first response value to the serving end includes sending the response message to the serving end.

With reference to any one of the second aspect or the first possible implementation of the second aspect, in a second possible implementation of the second aspect, the serving end is further configured to receive the password sent by the controller, and determine a third response value according to the password and the challenge information, where the VNC authentication succeeds if the serving end determines that the first response value is the same as the third response value.

It should be noted that, the controller generates one password for each serving end in an initial phase as a VNC login password, and sends the password to the serving end to determine whether authentication of the response value sent by the proxy server succeeds.

With reference to the possible implementation of the second aspect, in a third possible implementation of the second aspect, the controller is further configured to receive the VNC connection request from the client, obtain VNC connection information according to the VNC connection request of the client, where the VNC connection information includes a uniform resource locator (URL) of the proxy server, the IP address, the port number, and the password of the serving end, and the token, and send the URL of the proxy server and the token in the VNC connection information to the client, and the client is further configured to establish a connection to the proxy server according to the URL of the proxy server and the token.

The port number is a port number of a VNC service at the serving end.

In conclusion, in the foregoing system, compared with the other approaches, the proxy server replaces the client to complete a response in VNC authentication, and sensitive data of a user, such as a password, does not need to be transmitted to a network environment of an untrusted domain such that a problem in the other approaches that the sensitive data is leaked or decrypted by brute force because the password is transmitted to the network environment of the untrusted domain is avoided. Therefore, security in a VNC authentication process is improved. In addition, according to a processing process of the RFB protocol, in a process in which the client still receives challenge information and returns a response value, impact on the processing process of the RFB protocol in the other approaches is reduced, and information security in the VNC authentication process is improved.

According to a third aspect, a proxy server is provided, where the proxy server includes a receiving unit, an encryption unit, and a sending unit. The receiving unit is configured to receive a password sent by a controller, and receive challenge information sent by a serving end, where the challenge information is generated by the serving end based on VNC authentication. The encryption unit is configured to determine a first response value according to the password and the challenge information that are received by the receiving unit, and the sending unit is configured to send, to the serving end, the first response value determined by the encryption unit.

It should be noted that, the proxy server in this embodiment of the present disclosure may be implemented using an application-specific integrated circuit (ASIC), or may be implemented using a programmable logic device (PLD). The PLD may be a complex programmable logic device (CPLD), a field-programmable gate array (FPGA), a generic array logic (GAL), or any combination thereof. When the VNC authentication response method shown in the first aspect or another possible implementation of the first aspect is implemented by software, the proxy server and all modules of the proxy server may also be software modules.

Further, the challenge information is a 16-byte random number, the proxy server performs encryption on the challenge information according to the password and the challenge information using a predefined data encryption algorithm, to determine a first response value, and sends the first response value to the serving end in order to complete a response process in the VNC authentication.

It should be noted that, the predefined data encryption algorithm may be the Secure Hash Algorithm (SHA), or encryption may be performed according to another data encryption algorithm such as the Data Encryption Standard (DES). This is not limited in the present disclosure.

According to a description of the foregoing proxy server, compared with the other approaches, the proxy server may replace a client to complete a response process in VNC authentication, a problem that sensitive data of a user is leaked or decrypted by brute force because the sensitive data needs to be transmitted to a network environment of an untrusted domain when the client completes the response process is avoided, and security in a VNC authentication process is improved.

With reference to a possible implementation of the third aspect, in a first possible implementation of the third aspect, the proxy server further includes a replacement unit. The sending unit is further configured to send the challenge information to a client before sending, to the serving end, the first response value determined by the encryption unit. The receiving unit is further configured to receive a response message sent by the client, where the response message includes a second response value, and the second response value is the challenge information. The replacement unit is configured to replace the second response value in the response message with the first response value, and that the sending unit sends, to the serving end, the first response value determined by the encryption unit includes sending the response message to the serving end.

Further, the second response value is the challenge information. Further, the client does not process the challenge information, but directly sends the challenge information in a form of the response message to the proxy server as the response value. The proxy server replaces the second response value in the response message with the first response value, and sends the response message to the serving end. The serving end determines a third response value according to the password and the challenge information using a predefined data encryption algorithm that is the same as that of the proxy server, and compares the first response value with the third response value when the first response value is received. The VNC authentication succeeds if the first response value and the third response value are the same, or the VNC authentication fails if the first response value and the third response value are different, and this VNC connection request is terminated.

It should be noted that, the controller generates one password for each serving end in an initial phase as a VNC login password, and sends the password to the serving end to determine whether authentication of the response value sent by the proxy server succeeds.

With reference to the possible implementation of the third aspect, in a second possible implementation of the third aspect, the proxy server further includes a processing unit. The receiving unit is further configured to receive a connection request from a client before receiving the password sent by the controller. The processing unit is configured to obtain a token in the connection request of the client. The sending unit is further configured to send the token to the controller, and that the receiving unit receives the password sent by the controller includes receiving an authentication success message from the controller, where the authentication success message carries an IP address, a port number, and the password of the serving end.

Further, if the controller can authenticate the client according to the token, the controller sends the authentication success message to the proxy server, where the authentication success message carries the IP address, the port number, and the password of the serving end, and the port number is a port number of a VNC service, or this VNC connection request is terminated if the controller fails to perform authentication according to the token.

It should be noted that, if a target serving end to which the client requests to establish a VNC connection is a virtual machine, the IP address of the serving end is an IP address of a server on which the virtual machine is located, and the port number is a port number that uniquely identifies a VNC service of the virtual machine and that is allocated by the server on which the virtual machine is located.

With reference to the second possible implementation of the third aspect, in a third possible implementation of the third aspect, the processing unit is further configured to establish a connection to the serving end according to the IP address and the port number of the serving end in the authentication success message received by the receiving unit. The receiving unit is further configured to receive first protocol version information sent by the serving end, where the first protocol version information indicates a highest protocol version supported by the serving end. The sending unit is further configured to send, to the client, the first protocol version information received by the receiving unit. The receiving unit is further configured to receive second protocol version information sent by the client, where the second protocol version information indicates a highest protocol version that is not higher than the first protocol version information and that is supported by the client, and the sending unit is further configured to send the second protocol version information to the serving end.

With reference to the third possible implementation of the third aspect, in a fourth possible implementation of the third aspect, the receiving unit is further configured to receive a first security authentication type sent by the serving end, where the first security authentication type includes all security authentication types supported by the serving end. The sending unit is further configured to send the first security authentication type to the client. The receiving unit is further configured to receive a second security authentication type sent by the client, where the second security authentication type is a highest-level security authentication type supported by the client in the first security authentication type, and the sending unit is further configured to send the second security authentication type to the serving end.

It should be noted that, the first security authentication type is used only for identifying a security authentication type that is sent by the serving end to the proxy server, and does not indicate a quantity.

Further, if the security authentication type determined by the serving end is VNC authentication, the client and the serving end complete security authentication according to the VNC authentication type. If the security authentication type that is determined, by means of negotiation, by the serving end is none, no authentication needs to be performed between the client and the serving end, or if the security authentication type that is determined, by means of negotiation, by the serving end is invalid, a VNC session between the client and the serving end is terminated.

Optionally, during specific implementation, to ensure system security, a security authentication type is usually specified by the serving end. That is, the first security authentication type sent by the serving end is the specified security authentication type. If the second security authentication type returned by the client is different from the first security authentication type, a process for negotiating the security authentication type fails, and this VNC connection request is terminated.

According to a description of the foregoing proxy server, a serving end and a client determine, by means of negotiation, a protocol version and a security authentication type for this VNC connection request. When challenge information that is generated by the serving end according to VNC authentication is received, a response process in the VNC authentication is completed using the challenge information and a password. Compared with the other approaches, the proxy server is no longer used only for transmitting data packets between the serving end and the client, but may replace the client to complete the response process in the VNC authentication between the client and the serving end such that a problem that information is leaked or decrypted by brute force because sensitive data of a user is transmitted to an untrusted domain, and security in a VNC authentication process is improved.

In conclusion, according to a description of the foregoing content, a proxy server replaces a client to complete a response process in VNC authentication. Compared with the other approaches, the response process in the VNC authentication can be completed without a need to transmit sensitive data of a user, such as a password, to a network environment of an untrusted domain such that a problem that the sensitive data is leaked or decrypted by brute force because the password is transmitted to the untrusted domain is avoided. Therefore, security in a VNC authentication process is improved. In addition, according to a processing process of the RFB protocol, in a process in which the client still receives challenge information and returns a response value, impact on the processing process of the RFB protocol in the other approaches is reduced, and information security in the VNC authentication process is improved.

According to a fourth aspect, a proxy server is provided, where the proxy server includes a processor, a memory, a communications interface, and a bus, and the processor, the memory, and the communications interface are connected and communicate with each other using the bus, the memory is configured to store a computer execution instruction, and when the proxy server runs, the processor executes the computer execution instruction in the memory in order to perform, using hardware resources in the proxy server, the method according to any one of the first aspect, the first possible implementation of the first aspect, or the third possible implementation of the first aspect to the fifth possible implementation of the first aspect.

According to the foregoing proxy server, in VNC authentication, compared with the other approaches, the proxy server may replace a client to complete a response process of challenge information sent by a serving end such that a problem that sensitive data of a user is leaked or decrypted by brute force because the sensitive data is transmitted and stored in an untrusted domain is avoided, and security in a VNC authentication process is improved.

According to a fifth aspect, a computer readable medium is provided and configured to store a computer program, where the computer program includes an instruction that is used to perform the method according to any one of the first aspect, the first possible implementation of the first aspect, or the third possible implementation of the first aspect to the fifth possible implementation of the first aspect.

Based on the foregoing technical solution, embodiments of the present disclosure provide a response method and system in VNC authentication, and a proxy server. Compared with the other approaches, a proxy server replaces a client to complete a response process in VNC authentication such that a problem that sensitive data of a user is leaked or decrypted by brute force because the sensitive data is transmitted and stored in an untrusted domain is avoided, and security in a VNC authentication process is improved.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
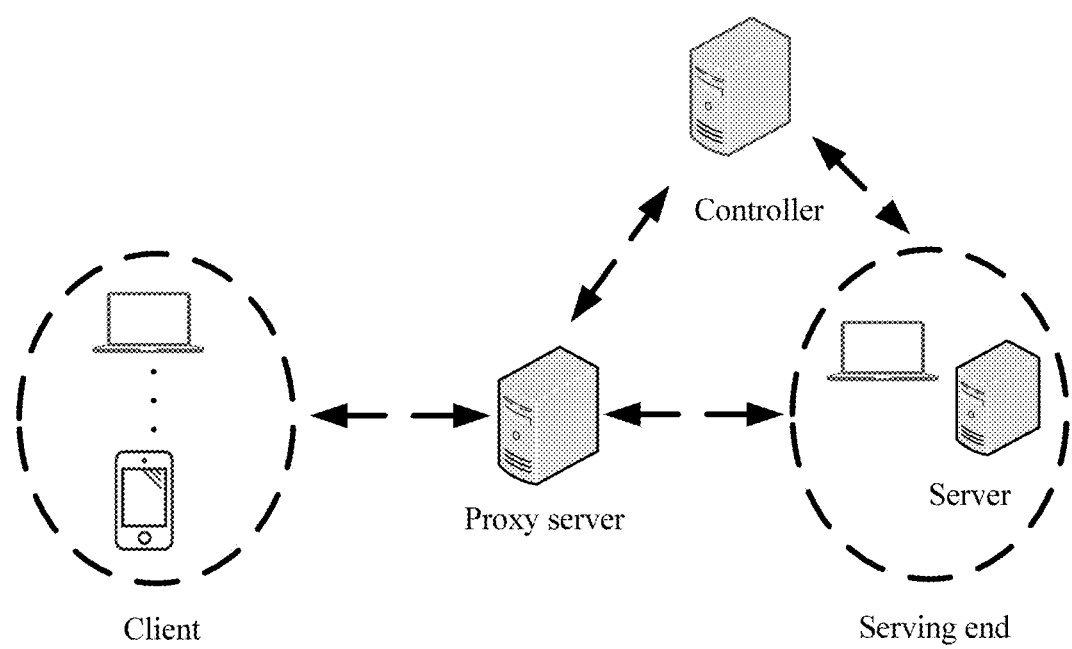
FIG. 1 is a schematic diagram of a network architecture of a VNC system according to an embodiment of the present disclosure.

FIG. 1 is a schematic diagram of a network architecture of a VNC system according to the present disclosure. As shown in FIG. 1, the network architecture includes a client, a proxy server, a serving end, and a controller. The client may be a browser or a VNC connection tool. The client may be deployed in a server and a personal computer (PC), or may be deployed in a mobile device, where the mobile device may be a portable computer or may be a mobile phone, an iPad, or the like. This is not limited in the present disclosure. The serving end is a VNC remote access destination end, and may be a server, or may be a virtual machine on a server. A data packet transmitted between the client and the serving end needs to be transmitted by the proxy server. That is, the server first sends the data packet to the proxy server, and then the proxy server sends the data packet to the client. The controller is configured to manage the proxy server and the serving end, and is responsible for determining, according to a VNC connection request from the client, VNC connection information such as a URL of the proxy server, and an IP address, a port number, and a password of the server, and a token. The port number is a port number of a VNC service at the serving end. The token is used in a VNC connection process in which the controller performs authentication on the client in order to determine validity of the client. The password is a VNC login password, and all passwords are centrally managed by the controller. If the serving end is a virtual machine, a password is generated when the virtual machine is created, the controller sends the password to a server on which the virtual machine is located, and the password is updated when the virtual machine restarts or the password has been used. If the serving end is a server, and when the controller establishes a connection to the server for the first time, the controller generates a password, and sends the password to the server, and the password is updated when the server restarts or the password has been used.

It should be noted that, during specific implementation, the proxy server may be independently deployed in one server according to a service scenario requirement, or may be deployed in the controller or at the serving end. That is, the proxy server is a software module in the controller or at the serving end. This is not limited in the present disclosure.

It should be further noted that there may be multiple clients, proxy servers, and serving ends in the network architecture shown in FIG. 1. Different users may separately access a target serving end using different clients and different proxy servers, and a same proxy server may simultaneously process multiple VNC connection requests of different clients and serving ends. In the following specific description of the present disclosure, detailed descriptions are further provided using an example in which there is only one client, one proxy server, and one serving end in the network architecture shown in FIG. 1.

A person skilled in the art should understand that, during specific implementation, a security system between an internal network and an external network is constructed using a network device such as a switch or a firewall such that, according to a specific rule, transmitted data is allowed to pass or prevented from passing the security system. The internal network is classified as a trusted domain, and the external network is classified as an untrusted domain. Because of high security of data transmission in the trusted domain, sensitive data of a user is not stolen. However, because there is no rule for limiting data transmission in the untrusted domain, security of the sensitive data of the user cannot be ensured.

For example, in an open-source cloud computing management platform OPENSTACK, a VNC service of the WEBSOCKET protocol based on a Secure Sockets Layer (SSL) is provided, for example, noVNC. The controller may be a Nova component. The serving end is a computing node in an OPENSTACK system. The client is a user browser. Nova-noVNCProxy is used as the proxy server. The user may establish, using the browser, a VNC connection request with a virtual machine in the computing node or the computing node. Nova-Api in the Nova component is responsible for calling Nova-Compute to collect VNC connection information of the VNC connection request. The VNC connection information includes a URL of the proxy server, and an IP address, a port number, and a password of the serving end, and a token. Nova-Consoleauth is responsible for storing the VNC connection information and performing authentication on the client according to the token. In a data transmission process, a network environment in which the client is located is an untrusted domain, and a network environment between the Nova-Api, the Nova-Consoleauth, the Nova-Compute, the noVNCProxy, and the computing node is a trusted domain.

With reference to the network architecture shown in FIG. 1, in the other approaches, when a VNC connection request is established between a client and a serving end, a controller sends a URL of a proxy server, a token, and a password in VNC connection information to the client, and the client locally stores the password in order to complete a VNC authentication response that is between the client and the server and that is in the RFB protocol. However, the password is sensitive data of a user. When a network on which the client is located is an untrusted domain, a problem that the sensitive data is leaked or decrypted by brute force may occur, and security in a VNC authentication process is affected. However, in a response method in VNC authentication provided in the present disclosure, the proxy server replaces the client to complete the response in the VNC authentication, and no longer sends the password to the client such that a problem that the sensitive data is leaked or decrypted by brute force because the sensitive data of the user is transmitted between the untrusted domain and the trusted domain, and the client stores the sensitive data in the untrusted domain is avoided, and the security of the VNC authentication process is improved.

Next, the response method in the VNC authentication provided in the present disclosure is described in detail with reference to the accompanying drawings.

Figure 2:
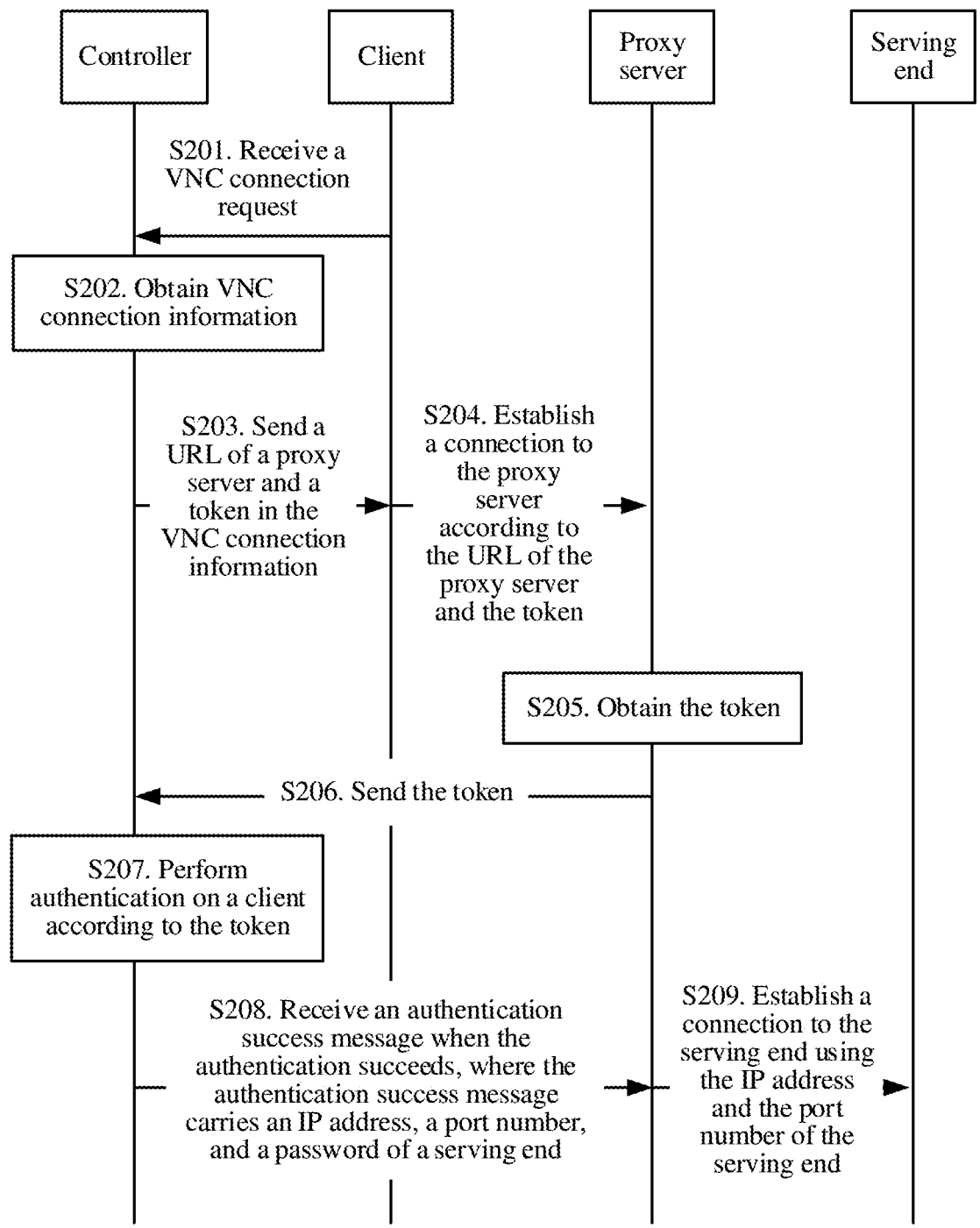
FIG. 2 is a schematic flowchart of a response method in VNC authentication according to an embodiment of the present disclosure.

A person skilled in the art should understood that, a communication connection between a client and a serving end needs to be transmitted by a proxy server. Before VNC authentication, the client needs to obtain VNC connection information from a controller, and establishes a connection to a corresponding proxy server. In addition, the proxy server needs to determine, using the controller, information about a serving end to which the client is to be connected, and establish a connection to the serving end, a specific process is shown in FIG. 2, and the method includes the following steps.

Step S201: A controller receives a VNC connection request sent by a client.

Further, a user sends the VNC connection request to the controller using a browser or a VNC connection tool, where the connection request includes information about a target serving end.

Step S202: The controller obtains VNC connection information according to the VNC connection request.

Further, the VNC connection information includes a URL of a proxy server, and an IP address, a port number, and a password of the serving end, and a token, where the port number is a port number of a VNC service at the serving end.

It should be noted that, if the target serving end to which the client requests to establish a VNC connection is a virtual machine, the IP address of the serving end is an IP address of a server on which the virtual machine is located, and the port number is a port number that uniquely identifies the VNC service of the virtual machine and that is allocated by the server on which the virtual machine is located.

For example, in an OPENSTACK system, Nova-Api receives the VNC connection request in step S201, calls Nova-Compute to obtain the VNC connection information of the VNC connection request, and then calls Nova-Consoleauth to store the VNC information in a memory.

Step S203: The controller sends a URL of the proxy server and a token in the VNC connection information to the client.

For example, the controller sends, to the client, information in the following form: https://IP: Port/vnc_auto.html?token=token_id, where "IP" is an IP address of the proxy server in the VNC connection information, and "Port" is a port number of a service based on the Hyper Text Transfer Protocol (HTTP) over SSL (HTTPS).

Step S204: The client establishes a connection to the proxy server according to the URL of the proxy server and the token.

For example, the client may be a browser, and establishes a connection to the proxy server using the URL and token information that are received in step S203 and that are in the following form: https://IP: Port/vnc_auto.html?token=token_id.

Step S205: The proxy server obtains the token.

Further, the token is a token in the connection request of the client in step S204 such that the controller performs authentication on the client according to the token, and determines whether the client can connect to the serving end by the proxy server. For example, the token is token_id in the following connection request: https://IP: Port/vnc_auto.html?token=token_id.

Step S206: The proxy server sends the token to the controller.

Further, the client sends the token obtained in step S205 to the controller.

Step S207: The controller performs authentication on the client according to the token.

Step S208: The proxy server receives an authentication success message sent by the controller when the authentication succeeds, where the authentication success message carries an IP address, a port number, and a password of the serving end.

Further, when the authentication succeeds, the controller sends the authentication success message to the proxy server, where the authentication success message carries the IP address, the port number, and the password of the serving end, and the port number is the port number of the VNC service, or when the authentication fails, this VNC connection request is terminated.

Step S209: The proxy server establishes a connection to the serving end using the IP address and the port number of the serving end.

Further, the IP address and the port number of the serving end are the IP address and the port number of the serving end that are carried in the authentication success message in step S208.

According to a description of step S201 to step S209, if a controller can authenticate a client according to a token, a password is sent to a proxy server. Further, the proxy server replaces the client to complete a response process in VNC authentication. Compared with the other approaches in which sensitive data of a user, such as a password, is transmitted to the client, a process in which the sensitive data of the user is transmitted between a trusted domain and an untrusted domain is avoided. In addition, a problem that the sensitive data is leaked or decrypted by brute force because the sensitive data is stored in the untrusted domain is avoided, and security of a VNC authentication process is improved.

Figure 3:
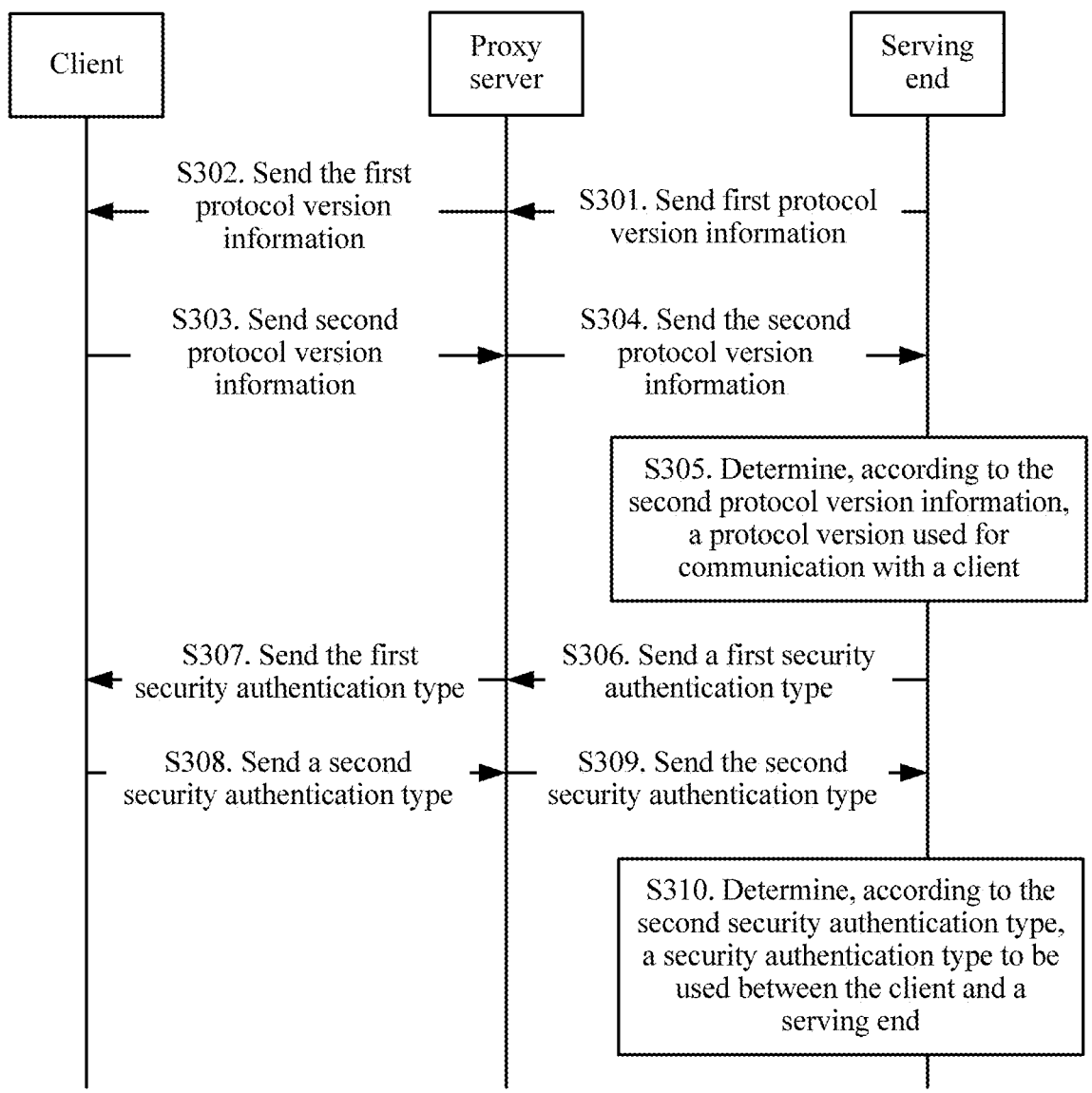
FIG. 3 is a schematic flowchart of another response method in VNC authentication according to an embodiment of the present disclosure.

With reference to a description of the foregoing content, a communication connection is already established between a client, a proxy server, and a serving end. Further, the serving end and the client negotiate, according to an RFB protocol, a protocol version and a security authentication type that are used in a VNC connection request. A specific process is shown in FIG. 3, and the method includes the following steps.

Step S301: A serving end sends first protocol version information to a proxy server.

Further, the first protocol version information indicates a highest RFB protocol version supported by the serving end.

For example, if the serving end supports three protocol versions, 3.3, 3.7, and 3.8, and 3.8 is the highest version, the first protocol version information sent by the serving end to the proxy server is 3.8. The serving end sends, to the proxy server, a data packet in the following format: Protocol version message: RFB 003.008\n (hex 52 46 42 20 30 30 33 2e 30 30 38 0a).

Optionally, the proxy server may monitor the data packet sent by the serving end, and determine, according to a keyword, an RFB protocol version and a security authentication type in one VNC connection request that are needed by a client and the serving end.

Further, the proxy server may simultaneously process multiple VNC sessions of the client and the serving end, and the proxy server needs to determine start of each session in order to identify, according to the keyword, challenge information sent by the serving end.

For example, if the proxy server detects, by means of monitoring, that a data packet sent by the serving end includes a keyword in a format of RFB *.*\n, the proxy server determines that this VNC session starts.

Step S302: The proxy server sends the first protocol version information to the client.

Step S303: The client sends second protocol version information to the proxy server.

Further, the second protocol version information indicates a highest RFB protocol version that is not higher than the first protocol version information and that is supported by the client.

For example, if the client supports RFB protocol versions 3.7 and 3.8, and the first protocol version information received from the proxy server is 3.8, a highest protocol version that is not higher than the first protocol version information and that is supported by the client is 3.8. That is, the second protocol version information sent by the client to the proxy server is 3.8.

Step S304: The proxy server sends the second protocol version information to the serving end.

Step S305: The serving end determines, according to the second protocol version information, a protocol version used for communication with the client.

Further, the serving end determines the protocol version of this VNC connection request according to the second protocol version information of the client that is sent by the proxy server.

For example, if the second protocol version information is 3.8, and the serving end supports this protocol version, the protocol version of this VNC connection request is 3.8.

Further, in a handshake phase of the RFB protocol, after determining the protocol version of this VNC connection request, the serving end and the client continue to negotiate a security authentication type of this VNC connection request, and a process for determining the security authentication type is as follows.

Step S306: The serving end sends a first security authentication type to the proxy server.

Further, according to the protocol version information determined in step S305, different protocol versions support different security authentication types and authentication processes, and the first security authentication type includes all security authentication types supported by a serving end in the determined protocol version information.

It should be noted that, the first security authentication type is used only for identifying a security authentication type that is sent by the serving end to the proxy server, and does not indicate a quantity.

For example, if the serving end supports three security authentication types, invalid, none, and VNC authentication (that is, challenge/response authentication), the first security authentication type includes the foregoing three security authentication types.

Step S307: The proxy server sends the first security authentication type to the client.

Step S308: The client sends a second security authentication type to the proxy server.

Further, the second security authentication type is a highest-level security authentication type supported by the client in the first security authentication type.

For example, if the first security authentication type received by the client includes invalid, none, and VNC authentication (that is, challenge/response authentication), and the client supports the foregoing three types, the second security authentication type is a VNC authentication type with a highest security level, that is, a challenge/response authentication manner.

Step S309: The proxy server sends the second security authentication type to the serving end.

Step S310: The serving end determines, according to the second security authentication type, a security authentication type to be used between the client and the serving end.

Further, if the security authentication type determined by the serving end is VNC authentication, the client and the serving end complete security authentication according to the VNC authentication type. If the security authentication type that is determined, by means of negotiation, by the serving end is none, no authentication needs to be performed between the client and the serving end, or if the security authentication type that is determined, by means of negotiation, by the serving end is invalid, a VNC session between the client and the serving end is terminated.

Optionally, during specific implementation, to ensure system security, a security authentication type is usually specified by the serving end. That is, the first security authentication type sent by the serving end in step S306 is the specified security authentication type. If the second security authentication type returned by the client is different from the first security authentication type, a process for negotiating the security authentication type fails, and this VNC connection request is terminated.

According to a description of the foregoing steps S301 to S310, a serving end and a client determine, by means of negotiation, a protocol version and a security authentication type for this VNC connection request. Further, when receiving challenge information that is generated by the serving end according to VNC authentication, a proxy server completes a response process in the VNC authentication using the challenge information and a password. Compared with the other approaches, the proxy server is no longer used only for transmitting data packets between the serving end and the client, but may also replace the client to complete the response process in the VNC authentication between the client and the serving end such that a problem that sensitive data of a user is leaked or decrypted by brute force because the sensitive data is transmitted to an untrusted domain, and security in a VNC authentication process is improved.

Figure 4:
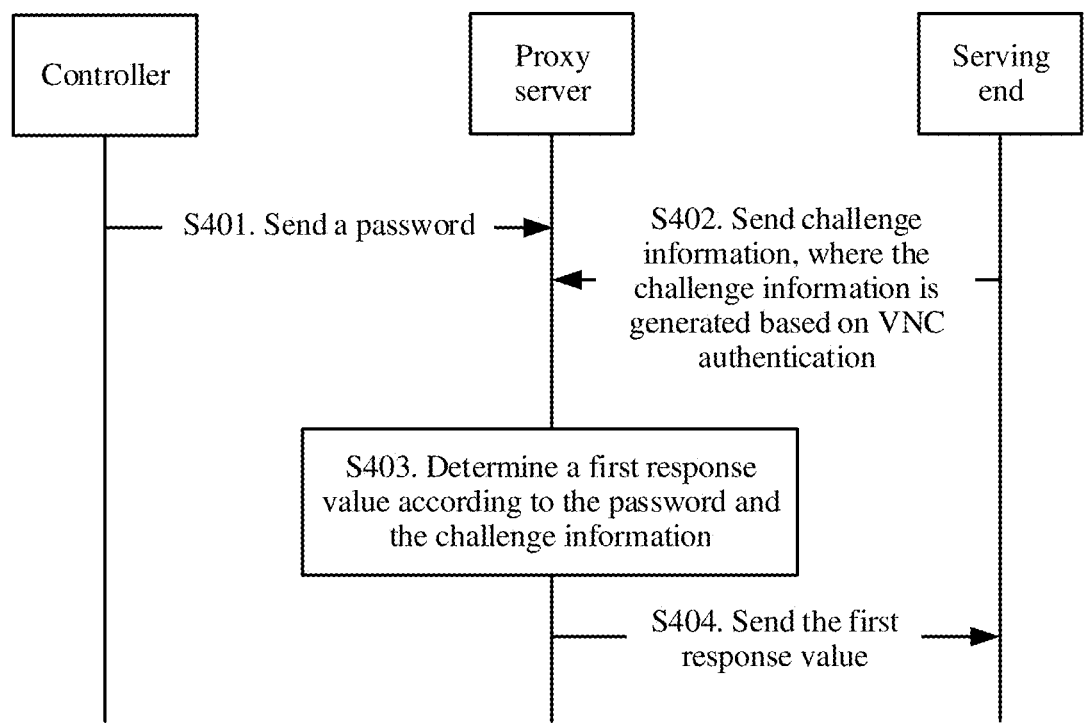
FIG. 4 is a schematic flowchart of another response method in VNC authentication according to an embodiment of the present disclosure.

With reference to a description of the foregoing content, in a possible embodiment of the present disclosure, if a serving end and a client determine that a security authentication type is VNC authentication, that is, challenge/response authentication, a proxy server can replace the client to complete the VNC authentication. A specific method is shown in FIG. 4, and the method includes the following steps.

Step S401: A controller sends a password to a proxy server.

Further, the password is carried in an authentication success message that is sent by the controller to the proxy server in step S208, and details are not described herein again.

Step S402: The serving end sends challenge information to the proxy server, where the challenge information is generated based on VNC authentication.

Further, the serving end generates the challenge information according to a VNC authentication type, and sends the challenge information to the proxy server, where the challenge information is a 16-byte random number.

Step S403: The proxy server determines a first response value according to the password and the challenge information.

Further, the proxy server performs encryption on the challenge information according to the password and the challenge information using a predefined data encryption algorithm, to determine the first response value.

It should be noted that, the predefined data encryption algorithm may be the SHA, or encryption may be performed according to another data encryption algorithm such as the DES. This is not limited in the present disclosure.

For example, the proxy server performs, according to an SHA256 data encryption algorithm, encryption on the password and the challenge information to determine the first response value.

Step S404: The proxy server sends the first response value to the serving end.

Further, the serving end determines a third response value according to the password and the challenge information that are sent by the controller using a predefined data encryption algorithm that is the same as that of the proxy server, and compares the first response value with the third response value when the first response value is received. If the first response value and the third response value are the same, the VNC authentication succeeds, or if the first response value and the third response value are different, the VNC authentication fails, and this VNC connection request is terminated.

It should be noted that, the controller generates one password for each serving end in an initial phase as a VNC login password, and the controller sends the password to the serving end, to determine whether authentication of the response value sent by the proxy server succeeds.

According to a description of step S401 to step S404, in a response process in VNC authentication, after receiving challenge information sent by a serving end, a proxy server may determine a first response value according to a password and the challenge information, and send the first response value to the serving end in order to complete the response process in the VNC authentication. Compared with the other approaches, the proxy server replaces a client to complete the response process in the VNC authentication such that a problem that sensitive data of a user is leaked or decrypted by brute force because the sensitive data is transmitted to a network environment of an untrusted domain is avoided, and security in a VNC authentication process is improved.

Figure 5:
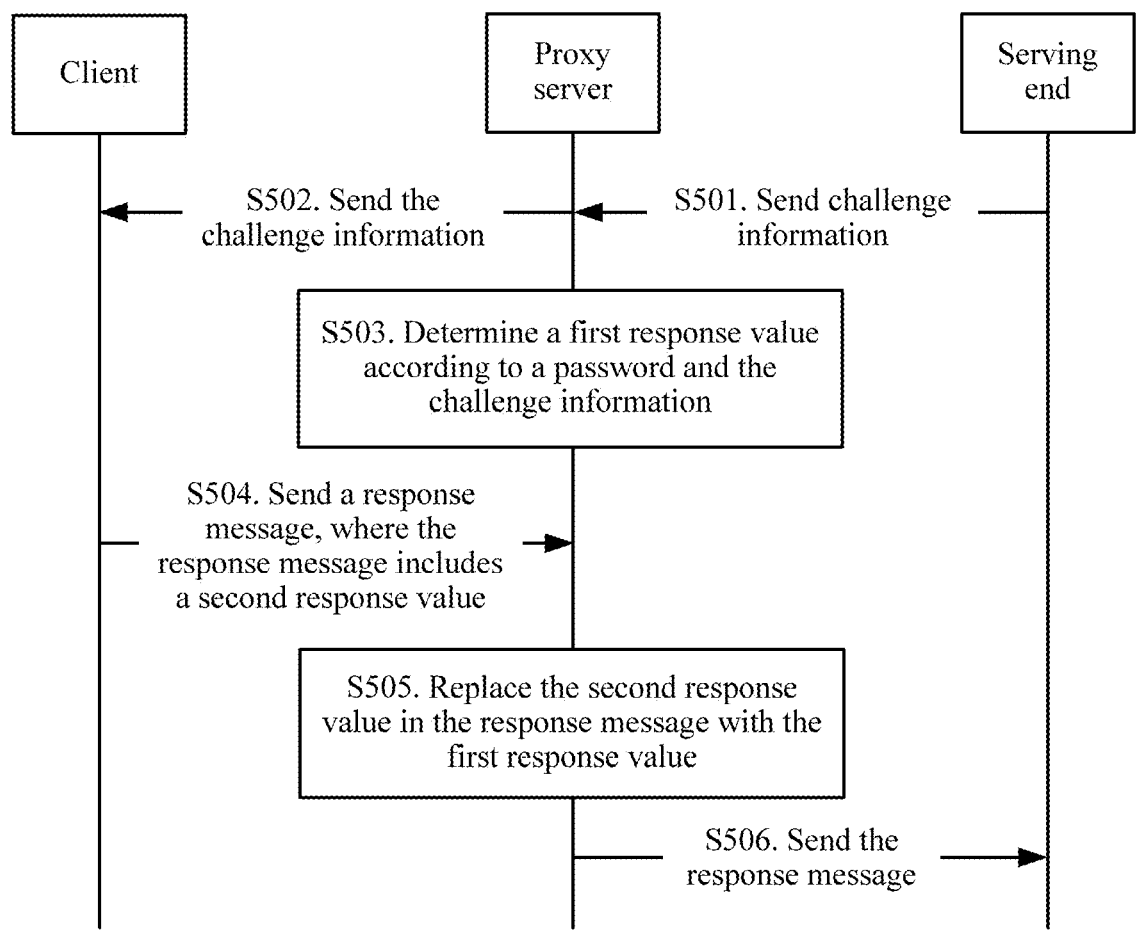
FIG. 5 is a schematic flowchart of another response method in VNC authentication according to an embodiment of the present disclosure.

In another possible embodiment of the present disclosure, to reduce impact on an RFB protocol, a response process in VNC authentication may be implemented using a method shown in FIG. 5, and the method includes the following steps.

Step S501: A serving end sends challenge information to a proxy server.

Further, a serving end sends the challenge information to the proxy server according to a security authentication type that is determined by means of negotiation in FIG. 3.

Step S502: The proxy server sends the challenge information to a client.

Further, the proxy server sends the challenge information received in step S501 to the client.

Step S503: The proxy server determines a first response value according to a password and the challenge information.

Further, implementation of step S503 is the same as that of step S403, and details are not described herein again.

Step S504: The client sends a response message to the proxy server, where the response message includes a second response value.

Further, the second response value is the challenge information. Further, the client does not process the challenge information, but directly sends the challenge information in a form of the response message to the proxy server as the response value.

Step S505: The proxy server replaces the second response value in the response message with the first response value.

Step S506: The proxy server sends the response message to the serving end.

Optionally, the serving end determines a third response value according to the password and the challenge information that are sent by the controller using a predefined data encryption algorithm that is the same as that of the proxy server, and compares the first response value with the third response value when the first response value is received. If the first response value and the third response value are the same, the VNC authentication succeeds, or if the first response value and the third response value are different, the VNC authentication fails, and this VNC connection request is terminated.

It should be noted that, the controller generates one password for each serving end in an initial phase as a VNC login password, and the controller sends the password to the serving end, to determine whether authentication of the response value sent by the proxy server succeeds.

According to a description of step S501 to step S506, when receiving challenge information, a proxy server may send the challenge information to a client. However, the client does not process the challenge information, but directly sends the challenge information in a form of a response message to the proxy server as a response value. The proxy server replaces the response value in the response message and sends the response message to the serving end in order to complete a response process in VNC authentication. Compared with the other approaches, sensitive data of a user, such as a password, does not need to be transmitted to an untrusted domain, and the response process in the VNC authentication can be completed in a network environment of a trusted domain such that a problem that the sensitive data is leaked or decrypted by brute force because the password is transmitted to the untrusted domain is avoided. Therefore, security in a VNC authentication process is improved. In addition, according to a processing process of the RFB protocol, in a process in which the client still receives the challenge information and returns the response value, impact on the processing process of the RFB protocol in the other approaches is reduced, and information security in the VNC authentication process is improved.

Figure 6:
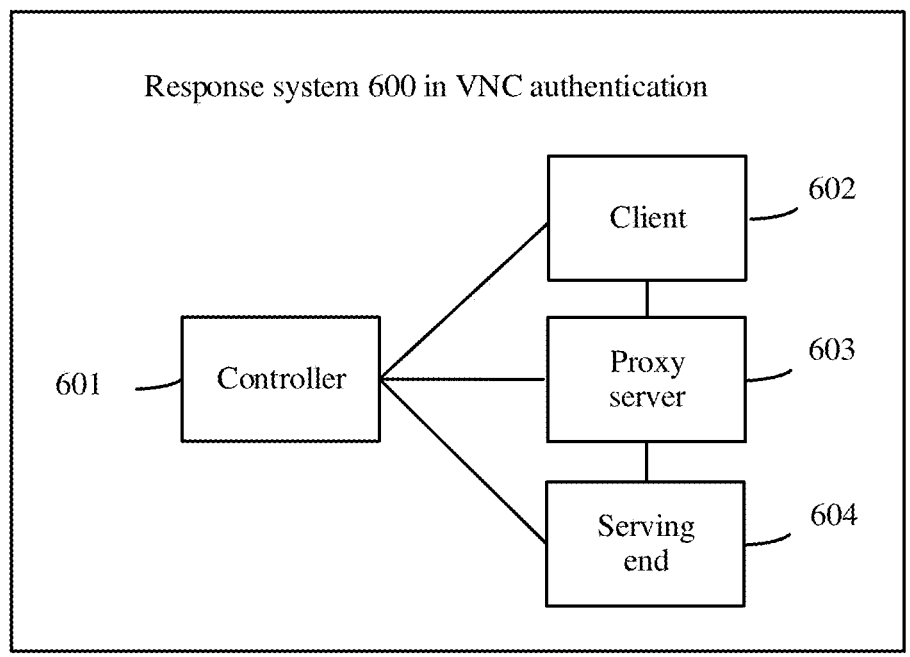
FIG. 6 is a schematic diagram of a response system in VNC authentication according to an embodiment of the present disclosure.

In a possible embodiment of the present disclosure, FIG. 6 is a schematic diagram of a response system 600 in VNC authentication according to an embodiment of the present disclosure. As shown in FIG. 6, the response system 600 in the VNC authentication includes a controller 601, a client 602, a proxy server 603, and a serving end 604.

The client 602 is configured to send a connection request to the proxy server 603.

The proxy server 603 is configured to obtain a token in the connection request, and send the token to the controller 601 for performing authentication.

The controller 601 is configured to perform authentication on the client 602 according to the token, and send an authentication success message to the proxy server 603 if the authentication succeeds, where the authentication success message carries an IP address, a port number, and a password of the serving end 604.

The proxy server 603 is further configured to receive the authentication success message sent by the controller 601, and establish a connection to the serving end 604 according to the IP address and the port number of the serving end 604.

The serving end 604 is configured to generate challenge information based on the VNC authentication, and send the challenge information to the proxy server 603.

The proxy server 603 is further configured to receive the challenge information, determine a first response value according to the password and the challenge information, and send the first response value to the serving end 604.

Further, the challenge information is a 16-byte random number, and the proxy server 603 performs encryption on the challenge information according to the password and the challenge information using a predefined data encryption algorithm to determine the first response value.

It should be noted that, the predefined data encryption algorithm may be the SHA, or encryption may be performed according to another data encryption algorithm such as the DES. This is not limited in the present disclosure.

According to a description of the foregoing response system 600 in the VNC authentication, in a response process in VNC authentication, after receiving challenge information sent by the serving end 604, the proxy server 603 may determine a first response value according to a password and the challenge information, and send the first response value to the serving end 604 in order to complete the response process in the VNC authentication. Compared with the other approaches, the proxy server 603 replaces the client 602 to complete the response process in the VNC authentication such that a problem that sensitive data of a user is leaked or decrypted by brute force because the sensitive data is transmitted to a network environment of an untrusted domain is avoided, and security in a VNC authentication process is improved.

Optionally, the proxy server 603 is further configured to send the challenge information to the client 602 before sending the first response value to the serving end 604, receive a response message sent by the client 602, where the response message includes a second response value, and the second response value is the challenge information, and replace the second response value in the response message with the first response value.

The proxy server 603 sending the first response value to the serving end 604 includes sending the response message to the serving end 604.

Further, the second response value is the challenge information. Further, the client 602 does not process the challenge information, but directly sends the challenge information in a form of the response message to the proxy server 603 as a response value.

Optionally, the serving end 604 is further configured to receive the password sent by the controller 601, and determine a third response value according to the password and the challenge information, where the VNC authentication succeeds if the serving end 604 determines that the first response value is the same as the third response value.

Further, the serving end 604 determines a third response value according to the password and the challenge information using a predefined data encryption algorithm that is the same as that of the proxy server 603, and compares the first response value with the third response value when the first response value is received. If the first response value and the third response value are the same, the VNC authentication succeeds, or if the first response value and the third response value are different, the VNC authentication fails, and this VNC connection request is terminated.

It should be noted that, the controller 601 generates one password for each serving end 604 in an initial phase as a VNC login password, and sends the password to the serving end 604 to determine whether authentication of the response value sent by the proxy server 603 succeeds.

Optionally, the controller 601 is further configured to receive the VNC connection request from the client 602, obtain VNC connection information according to the VNC connection request of the client 602, where the VNC connection information includes a URL of the proxy server 603, and the IP address, the port number, and the password of the serving end 604, and the token, and send the URL of the proxy server 603 and the token in the VNC connection information to the client 602.

The client 602 is further configured to establish a connection to the proxy server 603 according to the URL of the proxy server 603 and the token.

The port number is a port number of a VNC service at the serving end 604.

According to a description of the foregoing process, the controller 601 obtains VNC connection information according to a VNC connection request from the client 602, and no longer sends a password in the VNC connection information to the client 602, but sends the password to the proxy server 603, and the proxy server 603 stores the password such that it is ensured that the password is transmitted and stored in a trusted domain. Compared with the other approaches in which sensitive data of a user, such as a password, is transmitted to the client 602, a problem that the sensitive data of the user is leaked or decrypted by brute force because the sensitive data is transmitted between the trusted domain and an untrusted domain is avoided.

In conclusion, in the foregoing response system 600 in the VNC authentication, the proxy server 603 replaces the client 602 to complete a response in VNC authentication. Compared with the other approaches, sensitive data of a user, such as a password, does not need to be transmitted to a network environment of an untrusted domain such that a problem that the sensitive data is leaked or decrypted by brute force because the password is transmitted to the untrusted domain is avoided. Therefore, security in a VNC authentication process is improved. In addition, according to a processing process of the RFB protocol, in a process in which the client 602 still receives challenge information and returns a response value, impact on the processing process of the RFB protocol in the other approaches is reduced, and information security in the VNC authentication process is improved.

The foregoing describes in detail a response method in VNC authentication according to an embodiment of the present disclosure with reference to FIG. 1 to FIG. 6. The following describes a proxy server of VNC authentication according to an embodiment of the present disclosure with reference to FIG. 7 and FIG. 8.

Figure 7:
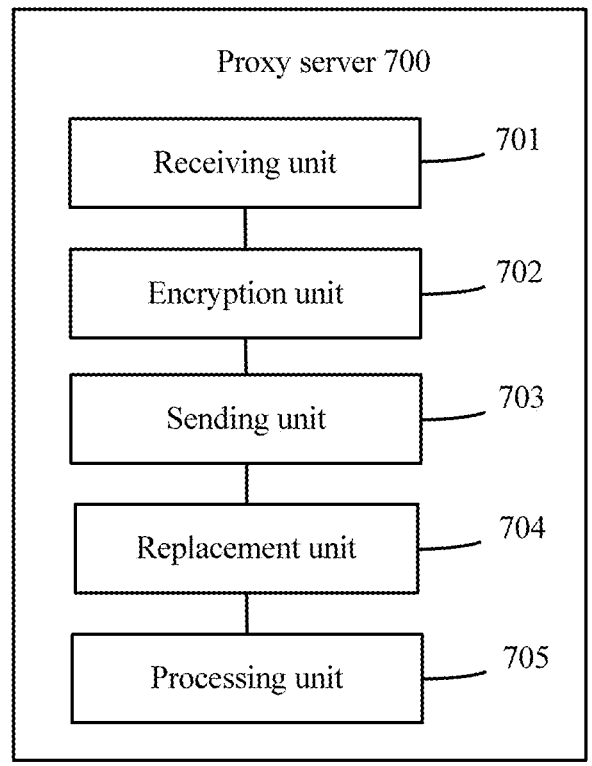
FIG. 7 is a schematic diagram of a proxy server according to an embodiment of the present disclosure.

FIG. 7 is a schematic diagram of a proxy server 700 according to the present disclosure. As shown in FIG. 7, the proxy server 700 includes a receiving unit 701, an encryption unit 702, and a sending unit 703.

The receiving unit 701 is configured to receive a password sent by a controller, and receive challenge information sent by a serving end, where the challenge information is generated by the serving end based on VNC authentication.

The encryption unit 702 is configured to determine a first response value according to the password and the challenge information that are received by the receiving unit 701.

The sending unit 703 is configured to send, to the serving end, the first response value determined by the encryption unit 702.

It should be noted that, the proxy server 700 in this embodiment of the present disclosure may be implemented using an ASIC, or may be implemented using a PLD. The PLD may be a CPLD, an FPGA, a GAL, or any combination thereof. When the response method in the VNC authentication shown in FIG. 4 is implemented by software, the proxy server 700 and all modules of the proxy server 700 may also be software modules.

Further, the challenge information is a 16-byte random number, and the proxy server 700 performs encryption on the challenge information according to the password and the challenge information using a predefined data encryption algorithm to determine the first response value.

It should be noted that, the predefined data encryption algorithm may be the SHA, or encryption may be performed according to another data encryption algorithm such as the DES. This is not limited in the present disclosure.

According to a description of the foregoing proxy server 700, compared with the other approaches, the proxy server 700 may replace a client to complete a response process in VNC authentication, a problem that sensitive data of a user is leaked or decrypted by brute force because the sensitive data needs to be transmitted to a network environment of an untrusted domain when the client completes the response process is avoided, and security in a VNC authentication process is improved.

Optionally, the proxy server 700 further includes a replacement unit 704.

The sending unit 703 is further configured to send the challenge information to a client before sending, to the serving end, the first response value determined by the encryption unit 702.

The receiving unit 701 is further configured to receive a response message sent by the client, where the response message includes a second response value, and the second response value is the challenge information.

The replacement unit 704 is configured to replace the second response value in the response message with the first response value.

That the sending unit 703 sends, to the serving end, the first response value determined by the encryption unit 702 includes sending the response message to the serving end.

Further, the second response value is the challenge information. Further, the client does not process the challenge information, but directly sends the challenge information in a form of the response message to the proxy server 700 as the response value. However, the proxy server 700 replaces the second response value in the response message with the first response value, and sends the response message to the serving end. The serving end determines a third response value according to the password and the challenge information using a predefined data encryption algorithm that is the same as that of the proxy server 700, and compares the first response value with the third response value when the first response value is received. If the first response value and the third response value are the same, the VNC authentication succeeds, or if the first response value and the third response value are different, the VNC authentication fails, and this VNC connection request is terminated.

It should be noted that, the controller generates one password for each serving end in an initial phase as a VNC login password, and sends the password to the serving end to determine whether authentication of the response value sent by the proxy server 700 succeeds.

Optionally, the proxy server 700 further includes a processing unit 705.

The receiving unit 701 is further configured to receive a connection request from a client before receiving the password sent by the controller.

The processing unit 705 is configured to obtain a token in the connection request of the client.

The sending unit 703 is further configured to send the token to the controller.

That the receiving unit 701 receives the password sent by the controller includes receiving an authentication success message from the controller, where the authentication success message carries an IP address, a port number, and the password of the serving end.

Further, if the authentication succeeds, the controller sends the authentication success message to the proxy server 700, where the authentication success message carries the IP address, the port number, and the password of the serving end, and the port number is a port number of a VNC service, or if the authentication fails, this VNC connection request is terminated.

It should be noted that, if a target serving end to which the client requests to establish a VNC connection is a virtual machine, the IP address of the serving end is an IP address of a server on which the virtual machine is located, and the port number is a port number that uniquely identifies a VNC service of the virtual machine and that is allocated by the server on which the virtual machine is located.

Optionally, the processing unit 705 is further configured to establish a connection to the serving end according to the IP address and the port number of the serving end in the authentication success message received by the receiving unit 701.

The receiving unit 701 is further configured to receive first protocol version information sent by the serving end, where the first protocol version information indicates a highest protocol version supported by the serving end.

The sending unit 703 is further configured to send, to the client, the first protocol version information received by the receiving unit 701.

The receiving unit 701 is further configured to receive second protocol version information sent by the client, where the second protocol version information indicates a highest protocol version that is not higher than the first protocol version information and that is supported by the client.

The sending unit 703 is further configured to send, to the serving end, the second protocol version information received by the receiving unit 701.

Further, in a handshake phase of the RFB protocol, after determining the protocol version of this VNC connection request, the serving end and the client continue to negotiate a security authentication type of this VNC connection request, and a process for determining the security authentication type is as follows.

Optionally, the receiving unit 701 is further configured to receive a first security authentication type sent by the serving end, where the first security authentication type includes all security authentication types supported by the serving end.

The sending unit 703 is further configured to send, to the client, the first security authentication type received by the receiving unit 701.

The receiving unit 701 is further configured to receive a second security authentication type sent by the client, where the second security authentication type is a highest-level security authentication type supported by the client in the first security authentication type.

The sending unit 703 is further configured to send, to the serving end, the second security authentication type received by the receiving unit 701.

It should be noted that, the first security authentication type is used only for identifying a security authentication type that is sent by the serving end to the proxy server 700, and does not indicate a quantity.

Further, if the security authentication type determined by the serving end is VNC authentication, the client and the serving end complete security authentication according to the VNC authentication type. If the security authentication type that is determined, by means of negotiation, by the serving end is none, no authentication needs to be performed between the client and the serving end, or if the security authentication type that is determined, by means of negotiation, by the serving end is invalid, a VNC session between the client and the serving end is terminated.

Optionally, during specific implementation, to ensure system security, a security authentication type is usually specified by the serving end. That is, the first security authentication type sent by the serving end is the specified security authentication type. If the second security authentication type returned by the client is different from the first security authentication type, a process for negotiating the security authentication type fails, and this VNC connection request is terminated.

According to a description of the foregoing proxy server 700, a serving end and a client determine, by means of negotiation, a protocol version and a security authentication type for this VNC connection request. When receiving challenge information that is generated by the serving end according to VNC authentication, the proxy server 700 completes a response process in the VNC authentication using the challenge information and a password. Compared with the other approaches, the proxy server 700 may replace the client to complete the response process in the VNC authentication between the client and the serving end such that a problem that information is leaked or decrypted by brute force because sensitive data of a user is transmitted to an untrusted domain is avoided, and security in a VNC authentication process is improved.

In conclusion, after the foregoing proxy server 700 receives challenge information, the proxy server 700 replaces a client to complete a response process in VNC authentication. Compared with the other approaches, the response process in the VNC authentication can be completed without a need to transmit sensitive data of a user, such as a password, to a network environment of an untrusted domain such that a problem in the other approaches that the sensitive data is leaked or decrypted by brute force because the password is transmitted to the untrusted domain is avoided. Therefore, security in a VNC authentication process is improved. In addition, according to a processing process of the RFB protocol, in a process in which the client still receives the challenge information and returns a response value, impact on the processing process of the RFB protocol in the other approaches is reduced, and information security in the VNC authentication process is improved.

Figure 8:
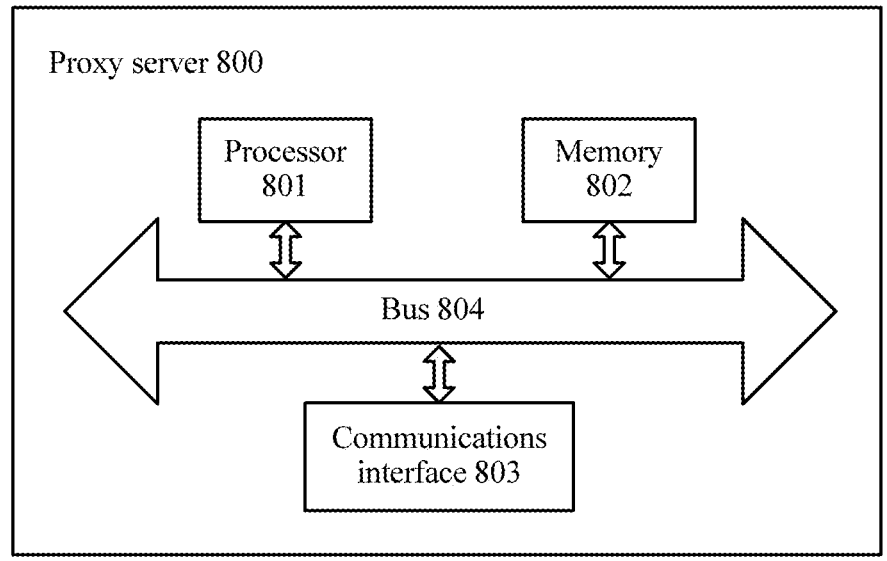
FIG. 8 is a schematic diagram of another proxy server according to an embodiment of the present disclosure.

FIG. 8 is a schematic diagram of a proxy server 800 according to the present disclosure. As shown in the figure, the proxy server 800 includes a processor 801, a memory 802, a communications interface 803, and a bus 804. The processor 801, the memory 802, and the communications interface 803 are connected and communicate with each other using the bus 804, the memory 802 is configured to store a computer execution instruction, and when the proxy server 800 runs, the processor 801 executes the computer execution instruction stored in the memory 802 to perform, using hardware resources in the proxy server 800, the operations of receiving a password sent by a controller, receiving challenge information sent by a serving end, where the challenge information is generated by the serving end based on VNC authentication, determining a first response value according to the password and the challenge information, and sending the first response value to the serving end.

The proxy server 800 according to this embodiment of the present disclosure may be corresponding to a method described in an embodiment of the present disclosure, and the foregoing and other operations and/or functions of the units in the proxy server 800 are respectively used to implement the corresponding procedures of the methods in FIG. 2 to FIG. 5. For brevity, details are not described herein again.

According to a description of the foregoing proxy server 800, in a response process in VNC authentication, compared with the other approaches, the proxy server 800 may replace a client to complete a response process of challenge information sent by a serving end such that a problem that sensitive data of a user is leaked or decrypted by brute force because the sensitive data is transmitted and stored in an untrusted domain is avoided, and security in a VNC authentication process is improved.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a PC, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A response method in virtual network computing authentication, comprising:
  establishing, by a proxy server, communication connections with a client, a controller, and a serving end;
  receiving, by the proxy server, a virtual network computing login password from the controller;
  receiving, by the proxy server, challenge information from the serving end, wherein the challenge information is generated by the serving end based on the virtual network computing authentication, and wherein the challenge information comprises a random number;
  determining, by the proxy server, a first response value according to the virtual network computing login password and the challenge information by the proxy server encrypting the virtual network computing login password and the random number using a predefined data encryption algorithm;
  sending, by the proxy server, the first response value to the serving end; and
  establishing, by the proxy server, a virtual network computing connection between the client and the serving end, wherein all data transmitted between the client and the serving end passes through the proxy server, and wherein the virtual network computing connection is established without sending the virtual network computing login password to the client or receiving the virtual network computing login password from client.

2. The response method of claim 1, wherein before sending the first response value to the serving end, the response method further comprises:
sending, by the proxy server, the challenge information to the client;
receiving, by the proxy server, a response message from the client, wherein the response message comprises a second response value, and wherein the second response value is the challenge information; and
replacing, by the proxy server, the second response value in the response message with the first response value, and
wherein sending the first response value to the serving end comprises sending the response message to the serving end.

3. The response method of claim 1, wherein before receiving the virtual network computing login password from the controller, the response method further comprises:
receiving, by the proxy server, a connection request from the client;
obtaining, by the proxy server, a token in the connection request of the client; and
sending, by the proxy server, the token to the controller, wherein receiving the virtual network computing login password from the controller comprises receiving, by the proxy server, an authentication success message from the controller, and
wherein the authentication success message carries the virtual network computing login password, an Internet Protocol (IP) address, and a port number of the serving end.

4. The response method of claim 3, wherein after receiving the virtual network computing login password from the controller, the response method further comprises:
establishing, by the proxy server, a connection to the serving end according to the IP address and the port number of the serving end;
receiving, by the proxy server, first protocol version information from the serving end, wherein the first protocol version information indicates a highest protocol version supported by the serving end;
sending, by the proxy server, the first protocol version information to the client;
receiving, by the proxy server, second protocol version information from the client, wherein the second protocol version information indicates a highest protocol version that is not higher than the first protocol version information and that is supported by the client; and
sending, by the proxy server, the second protocol version information to the serving end.

5. The response method of claim 4, further comprising:
receiving, by the proxy server, a first security authentication type from the serving end, wherein the first security authentication type comprises all security authentication types supported by the serving end;
sending, by the proxy server, the first security authentication type to the client;
receiving, by the proxy server, a second security authentication type from the client, wherein the second security authentication type is a highest-level security authentication type supported by the client in the first security authentication type; and
sending, by the proxy server, the second security authentication type to the serving end.

6. The response method of claim 1, wherein the random number comprises a 16-byte random number.

7. The response method of claim 1, wherein the predefined data encryption algorithm comprises a Secure Hash Algorithm (SHA).

8. The response method of claim 1, wherein the predefined data encryption algorithm comprises a Data Encryption Standard (DES) algorithm.

9. The response method of claim 1, wherein the client is in an untrusted environment.

10. The response method of claim 1, wherein the proxy server is in a trusted environment.

11. A response method in virtual network computing (VNC) authentication, comprising:
receiving, by a proxy server, a connection request from a client;
obtaining, by the proxy server, a token in the connection request of the client;
sending, by the proxy server, the token to a controller to enable the controller to perform authentication of the client according to the token;
receiving, by the proxy server, a password from the controller by receiving an authentication success message from the controller, wherein the authentication success message carries an Internet Protocol (IP) address, a port number, and the password of a serving end;
establishing, by the proxy server, a connection to the serving end according to the IP address and the port number of the serving end;
receiving, by the proxy server, challenge information from the serving end, wherein the challenge information is generated by the serving end based on a virtual network computing authentication type;
determining, by the proxy server, a first response value according to the password and the challenge information;
sending, by the proxy server, the challenge information to the client;
receiving, by the proxy server, a response message from the client, wherein the response message comprises a second response value, and wherein the second response value is the challenge information;
replacing, by the proxy server, the second response value in the response message with the first response value; and
sending, by the proxy server, the response message to the serving end.

12. The response method of claim 11, wherein after receiving, by the proxy server, the password from the controller, the response method further comprises:
receiving, by the proxy server, first protocol version information from the serving end, wherein the first protocol version information indicates a highest protocol version supported by the serving end;
sending, by the proxy server, the first protocol version information to the client;
receiving, by the proxy server, second protocol version information from the client, wherein the second protocol version information indicates a highest protocol version that is not higher than the first protocol version information and that is supported by the client; and sending, by the proxy server, the second protocol version information to the serving end to enable the serving end to determine, according to the second protocol version information, a protocol version that is used for communication with the client.

13. The response method of claim 12, further comprising:
receiving, by the proxy server, a first security authentication type from the serving end, wherein the first security authentication type comprises all security authentication types supported by the serving end;
sending, by the proxy server, the first security authentication type to the client;
receiving, by the proxy server, a second security authentication type from the client, wherein the second security authentication type is a highest-level security authentication type supported by the client in the first security authentication type; and
sending, by the proxy server, the second security authentication type to the serving end to enable the serving end to determine, according to the second security authentication type, a security authentication type to be used between the client and the serving end.

14. A response system in virtual network computing authentication, comprising:
a client configured to send a connection request to a proxy server;
the proxy server configured to:
obtain a token in the connection request; and
send the token to a controller for performing authentication; and
the controller configured to:
perform authentication of the client according to the token; and
send an authentication success message to the proxy server when the authentication succeeds, wherein the authentication success message carries an Internet Protocol (IP) address, a port number, and a password of a serving end,
wherein the proxy server is further configured to:
receive the authentication success message from the controller; and
establish a connection to the serving end according to the IP address and the port number of the serving end,
wherein the serving end is further configured to:
generate challenge information based on a virtual network computing authentication type; and
send the challenge information to the proxy server, and
wherein the proxy server is further configured to:
receive the challenge information;
determine a first response value according to the password and the challenge information;
send the first response value to the serving end;
send the challenge information to the client before sending the first response value to the serving end;
receive a response message from the client, wherein the response message comprises a second response value, and wherein the second response value is the challenge information;
replace the second response value in the response message with the first response value; and
send the first response value to the serving end by sending the response message to the serving end.

15. The response system of claim 14, wherein the controller is further configured to generate one password for the serving end in an initial phase as a virtual network computing login password and send the password to the serving end to determine whether the authentication of the first response value from the proxy server succeeds, wherein the serving end is further configured to receive the password from the controller and determine a third response value according to the password and the challenge information, and wherein the virtual network computing authentication succeeds when the serving end determines that the first response value is the same as the third response value.

16. The response system of claim 14, wherein the controller is further configured to receive a virtual network computing connection request from the client, obtain virtual network computing connection information according to the virtual network computing connection request, wherein the virtual network computing connection information comprises a uniform resource locator of the proxy server, the IP address, the port number, the token, and the password of the serving end, and send the uniform resource locator of the proxy server and the token in the virtual network computing connection information to the client, and wherein the client is further configured to establish a connection to the proxy server according to the uniform resource locator of the proxy server and the token.

17. A proxy server, comprising:
a memory comprising instructions; and
a processor coupled to the memory and configured to execute the instructions to cause the proxy server to:
receive a connection request from a client;
obtain a token in the connection request of the client;
send the token to a controller;
receive a password from the controller;
receive the password from the controller by receiving an authentication success message from the controller, wherein the authentication success message carries an Internet Protocol (IP) address, a port number, and the password of a serving end;
establish a connection to the serving end according to the IP address and the port number of the serving end in when authentication succeeds;
receive challenge information from the serving end, wherein the challenge information is generated by the serving end based on a virtual network computing authentication type;
determine a first response value according to the password and the challenge information that are received;
send the challenge information to the client;
receive a response message from the client, wherein the response message comprises a second response value, and wherein the second response value is the challenge information;
replace the second response value in the response message with the first response value; and
send, to the serving end, the response message.

18. The proxy server of claim 17, wherein the instructions further cause the proxy server to:
receive first protocol version information from the serving end, wherein the first protocol version information indicates a highest protocol version supported by the serving end;
send the first protocol version information to the client;
receive second protocol version information from the client, wherein the second protocol version information indicates a highest protocol version that is not higher than the first protocol version information and that is supported by the client; and
send the second protocol version information to the serving end.

19. The proxy server of claim 18, wherein the instructions further cause the proxy server to:
- receive a first security authentication type from the serving end, wherein the first security authentication type comprises all security authentication types supported by the serving end;
- send the first security authentication type to the client;
- receive a second security authentication type from the client, wherein the second security authentication type is a highest-level security authentication type supported by the client in the first security authentication type; and
- send the second security authentication type to the serving end.

20. The proxy server of claim 17, wherein the challenge information comprises a 16-byte random number.

* * * * *